United States Patent [19]
Yamamoto et al.

[11] Patent Number: 5,111,526
[45] Date of Patent: May 5, 1992

[54] PLASTIC OPTICAL FIBERS AND PROCESS FOR THE PRODUCTION THEREOF

[75] Inventors: Takashi Yamamoto; Tsuruyoshi Matsumoto; Katsuhiko Shimada, all of Ohtake, Japan

[73] Assignee: Mitsubishi Rayon Co., Ltd., Tokyo, Japan

[21] Appl. No.: 642,844

[22] Filed: Jan. 18, 1991

[30] Foreign Application Priority Data

Jan. 19, 1990 [JP] Japan ................................. 2-8126
Nov. 20, 1990 [JP] Japan ................................. 2-312931

[51] Int. Cl.⁵ .................. G02B 6/00; B32B 27/00; C08F 8/00; B29D 11/00
[52] U.S. Cl. ............................. 385/145; 385/143; 428/421; 428/422; 525/326.2; 264/1.5; 264/1.6; 264/2.7
[58] Field of Search .................... 350/96.30, 96.34, 320; 428/421, 422; 264/1.5, 1.6, 2.7; 427/163; 525/326.2; 385/141, 143, 145, 142, 144

[56] References Cited

U.S. PATENT DOCUMENTS

| | | | |
|---|---|---|---|
| 4,946,902 | 8/1990 | Bekiarian et al. | 525/326.2 |
| 4,966,435 | 10/1990 | Matsumoto et al. | 350/96.34 |
| 4,977,025 | 12/1990 | Squire | 428/421 |
| 4,977,026 | 12/1990 | Squire | 428/422 |
| 4,979,799 | 12/1990 | Herbrechtsmeier et al. | 385/145 X |
| 4,984,870 | 1/1991 | Herbrechtsmeier et al. | 385/145 X |
| 4,985,308 | 1/1991 | Squire | 428/422 |
| 4,989,947 | 2/1991 | Sasaki et al. | 385/145 |
| 5,006,382 | 4/1991 | Squire | 428/422 X |

FOREIGN PATENT DOCUMENTS

| | | | |
|---|---|---|---|
| 340555A2 | 11/1989 | European Pat. Off. | 385/141 X |
| 340557A2 | 11/1989 | European Pat. Off. | 385/141 X |

*Primary Examiner*—Brian Healy
*Attorney, Agent, or Firm*—Finnegan, Henderson, Farabow, Garrett & Dunner

[57] ABSTRACT

A plastic optical fiber comprising a core polymer having a refractive index of $n_1$, which comprises a polymer of $\alpha, \beta$-unsaturated carboxylic acid fluoroalkylester represented by the general formula [I] as the main monomer, and a clad copolymer having a refractive index of $n_2$, which comprises perfluoro(2,2-dimethyl-1,3-dioxole) as the main monomer, and which satisfies the relationship of $(n_1 - n_2 \geq 0.01)$:

$$CY_2 = C - \underset{\underset{O}{\|}}{C} - O - Rf \quad [I]$$
$$\phantom{CY_2=}\overset{|}{X}$$

wherein X represents $CH_3$, H, D, F, Cl, or $CF_3$, Y represents H or D, and Rf represents a fluoroalkyl group having a linear or branched chain. The optical fiber is prepared by a melt-extrusion method. The optical fiber has excellent light transmitting properties, and it is suitable as an optical fiber for long distance light communication.

9 Claims, 1 Drawing Sheet

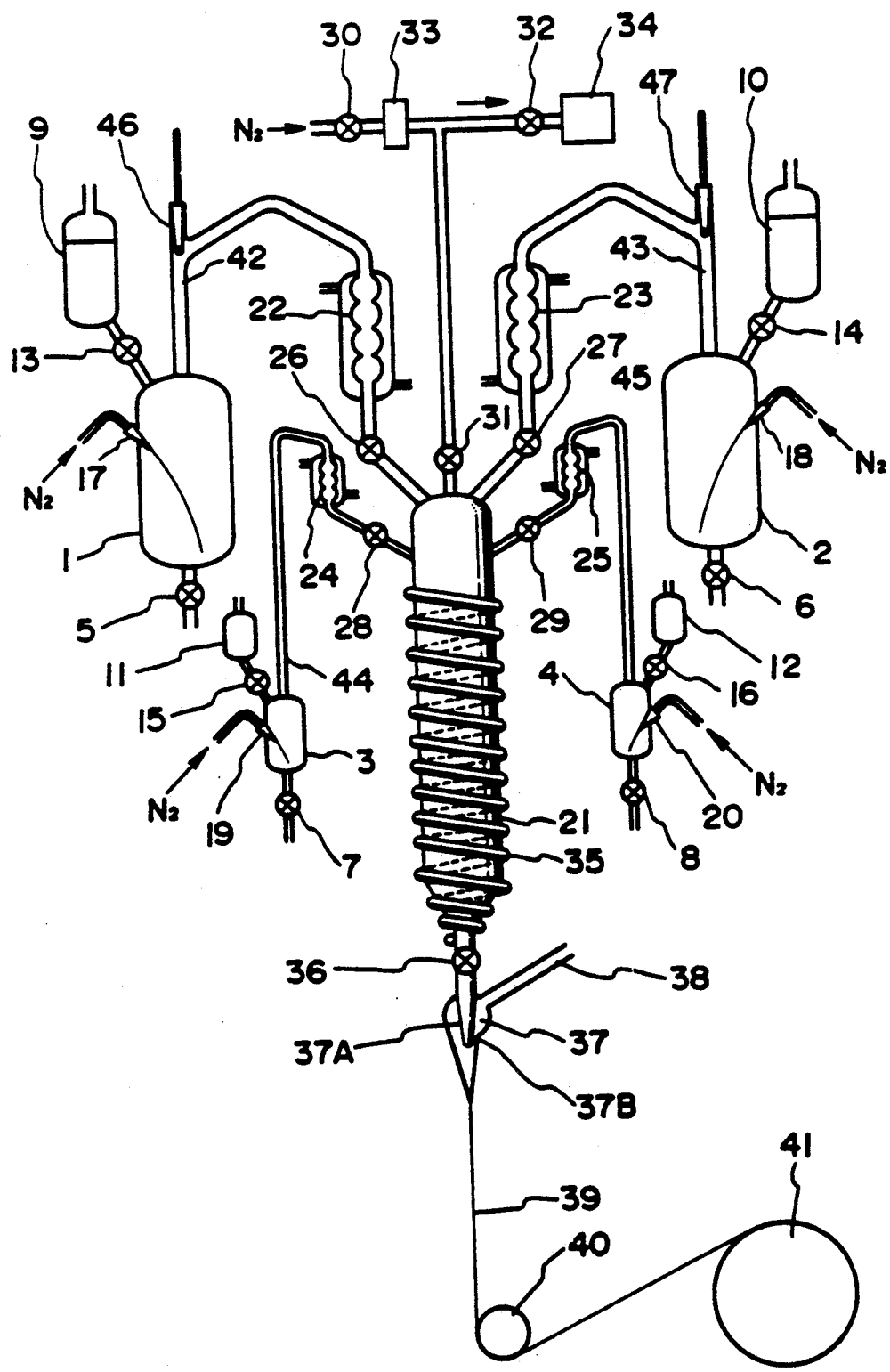

PLASTIC OPTICAL FIBERS AND PROCESS FOR THE PRODUCTION THEREOF

BACKGROUND OF THE INVENTION

1. Field of the Invention

The present invention relates to a plastic optical fiber and a process for the production of the same. More specifically, the present invention relates to a plastic optical fiber which can be used as optical fiber codes and optical fiber cables.

2. Description of the Related Art

Inorganic glass optical fibers have been known as optical fibers which are excellent in light transmission properties over a broad range of wavelengths. However, since said glass optical fibers are not good in processability or flexural strength, plastic optical fibers were developed and have been widely used as optical fibers.

These plastic optical fibers are comprised of a core polymer comprising a polymer which has excellent light transmission properties and a high refractive index, such as polymethylmethacrylate (hereinafter referred to as PMMA), polycarbonate (hereinafter referred to as PC), and a clad polymer comprising a transparent polymer which has a refractive index lower than that of the core polymer such as fluorine-containing polymer.

Known examples of the plastic optical fibers of this type are optical fiber strands, bulk fibers made by covering optical fiber strands with a functional protective layer, optical fiber codes made by covering optical fiber strands with a jacket, bundle fibers made of an assembly of bulk fibers and optical fiber cables made by applying tension members to the bulk fibers.

These plastic optical fibers, however, have many C—H bonds in the core polymer, and light absorption based on the expansion and contraction, or vibration of the C—H bonds appears at the regions of short wavelengths. Five to eight times the harmonic absorption also appears at the near infrared to visible ray region, namely, at a wavelength of not less than 400 nm. These serious light transmission losses in these regions have to be eliminated to use these conventional plastic optical fibers for light transmission. For example, the transmission loss of an optical fiber having a core of PMMA is about 100 dB/Km at a wavelength of 650 nm, and about 400 dB/Km at a wavelength of 780 nm. To avoid the transmission losses based on the C—H bonds in the core polymer, a core polymer comprising $d_8$-PMMA, of which all the H atoms in PMMA are replaced by D atoms, was proposed. This optical fiber containing $d_8$-PMMA as a core polymer has a transmission loss of 50 dB/Km at a wavelength of 780 nm. Deutrated PMMA, however, has high water absorbing properties, and over time the $d_8$-PMMA core polymer absorbs water, and the transmission loss will increase over time. An optical fiber showing such an increase in transmission loss cannot be used as an optical fiber, as an optical fiber is expected to have a high reliability over a long period.

At present LEDs that can emit rays in the near infrared region, and which have high power, and which can be used for high-speed data transmission have been produced in large quantities with a low cost. Since conventional plastic optical fibers, however, cannot use these LEDs as a light source for optical communications, light transmission beyond a wave guide length longer than 100 m cannot be accomplished with one optical fiber. Thus, LAN systems (Local-Area Network Systems) using plastic optical fibers, have not been so wide spread.

Recently, plastic optical fibers that can transmit rays in the near infrared region have been developed. For example, an optical fiber comprising a core polymer of a fluoroalkyl-α-fluoroacrylate polymer, and a clad copolymer of vinyliden fluoride and tetrafluoroethylene, was disclosed in EP 340557 A2 and EP 340555 A2. This optical fiber can transmit rays having a wavelength in the near infrared region, but its performance as an optical fiber is not satisfactory, since the difference in the refractive index between the core polymer and the clad polymer is not large enough to make an optical fiber having a large numerical aperture, and thus this optical fiber is not satisfactory as an optical fiber for transmitting data in a great amount. Further, because of its small numerical aperture, it is difficult for this optical fiber to inhibit the leakage of rays from its side surface when it is bent, and thus it is not satisfactory as an optical fiber for data communication.

Furthermore, the vinylidene fluoride-tetrafluoroethylene copolymer is not a perfect amorphous polymer, and has light-absorbing properties or light-scattering properties. Thus, an optical fiber containing this clad copolymer is not necessarily satisfactory in light transmission properties.

SUMMARY OF THE INVENTION

An object of the present invention is to provide a plastic optical fiber which is excellent in light transmission properties.

Another object of the present invention is to provide a plastic optical fiber which is suitable as an optical fiber for long distance light communication.

According to the present invention, the above-mentioned objects, and other objects, can be attained by a plastic optical fiber comprising a core polymer having a refractive index of $n_1$, which comprises a polymer of α,β-unsaturated carboxylic acid fluoroalkylester represented by the general formula [I] as the main monomer, and a clad copolymer having refractive a index of $n_2$ which comprises perfluoro(2,2-dimethyl-1,3-dioxole) as the main monomer, and which satisfies the relationship of $(n_1 - n_2 \geq 0.01)$:

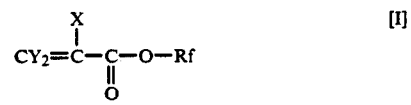

[I]

wherein X represents $CH_3$, H, D, F, Cl, or $CF_3$, Y represents H or D, and Rf represents a fluoroalkyl group having a linear or branched chain.

BRIEF DESCRIPTION OF THE DRAWING

The Figure is a flow chart of one example of an apparatus for manufacturing the plastic optical fiber of the present invention.

DESCRIPTION OF THE PREFERRED EMBODIMENTS

Heretofore have been developed conventional plastic optical fibers composed of a core polymer having many C—H bonds in a molecule, and thus light transmission loss is a serious problem, and long distance light communication of 1 km or more cannot be accomplished. In contrast, the core polymer used in the present invention does not contain many C—H bonds in a molecule, but contain many C—F bonds, and thus it can eliminate extreme light absorption losses caused by the expansion and contraction, or vibration of the C—H bonds. Further, the core polymer used in the present invention has very small water-absorbing properties, because of the many fluorine atoms it contains, and thus the optical fiber of the present invention, which composed of this core polymer can decrease light absorption caused by the water absorption of the core polymer.

It has been admitted in the art that it becomes very difficult to choose a proper clad material a polymer having a low refractive index, such as the core polymer used in the present invention, is used as a core polymer. To cope with this difficulty, the inventors of the present invention have found that a clad copolymer comprising perfluoro(2,2-dimethyl-1,3-dioxole) as a main monomer, such as a copolymer of perfluoro(2,2-dimethyl-1,3-dioxole), and at least one other ethylenically unsaturated monomer, can be used as a transparent clad material.

The core polymer used in the present invention is a homopolymer of a monomer represented by the general formula [I], or a copolymer of the monomer represent by the general formula [I], and another comonomer.

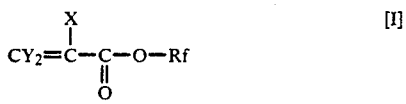

wherein X, Y, and Rf represent the same as mentioned above.

Examples of the monomer represented by the formula [I] include acrylates containing a fluoroalkyl group or a perfluoroalkyl group as Rf,α-fluoroacrylates, α-chloroacrylates, or methacrylates. Examples of the Rf group include a linear fluoroalkyl group represented by —$(CH_2)_m(CF_2)_nZ$ (wherein m is an integer of 0 to 2; n is an integer of 1 to 12; Z is H or F), or —$CH_2C(CF_3)_2A$ (wherein A represents H, D, F, an aliphatic alkyl or alicyclic alkyl group, or an aromatic alkyl group), and —$C(CF_3)_2A$ (wherein A represents the same as mentioned above).

As stated above, the core polymer used in the present invention comprises a monomer represented by the formula [I] as the main monomer, and it preferably contains a monomer unit represented by formula [I] in at least 30 mole %, more preferably in at least 75 mole %. If the content of this monomer unit is less than 30 mole %, the amount of the C—H bonds in the core polymer becomes high, and the water absorption becomes high. Thus, a plastic optical fiber excellent in light transmission cannot be obtained.

Examples of the other monomers copolymerizable with the monomer represented by the formula [I] include methacrylates,α-fluoroacrylate, or acrylates whose ester is methylester, ethylester, butylester, t-butylester, cyclohexylester, phenylester, or isobornylester, maleimides, phenylmaleimides, acrylic acid, methacrylic acid, itaconic acid, styrene, α-methylstyrene, p-chlorostyrene, acrylonitrile, vinyl acetate.

In order to enhance the light transmission properties of an optical fiber, it is preferable that the core polymer can be easily filtrated, in order to eliminate contaminants from the core polymer. The glass transition temperature of the core polymer should preferably be not higher than 150° C., and more preferably, be within the range of 0° C. to 140° C., in order to make the optical fiber flexible enough. The optical fiber composed of this core polymer is one of a very low transmission loss, and exhibits excellent flexibility, handling characteristics, and fire retardancy. Thus it can be suitably used as an optical fiber for light communications in such areas as LAN or FA (Factory Automation).

Contaminants having a diameter of 0.5 μm or more in the core polymer seriously decrease the light transmission properties of an optical fiber, and they are preferably filtered off to make an optical fiber which can be used for long distance communications of 1 km or more. The amount of the contaminants preferably be not more than 10,000 per gram of polymer.

Polymerization catalysts, monomers, molecular weight modifiers, and polymerization media are preferably purified by distillation, filtration with a membrane filter, or sublimation, to prepare a polymer which does not contain many contaminants. The polymerization of the core polymer preferably be conducted in a closed and dust-free system. The cleanliness values of the polymerization system are measured by the method stated in Fed. Std. No. 209B, and they are preferably not less than 100.

Further, the core polymer polymerized is preferably filtrated with a filter made of fibers of metals or ceramics, or sintered materials of metals or ceramics, before the spinning.

The amount of contaminants in the core polymer is measured with HIAC/ROYCO Liquid Fine Particle Counter made by HIAC/ROYCO Kabushiki Kaisha, and is expressed by the counted number of fine particles contained in a 1 g sample of a polymer solution of 0.1 wt %.

The refractive index $n_1$ of the core polymer used in the present invention has a relatively low value, and is in the range of 1.33 to 1.46. The refractive index $n_2$ of the clad polymer used in the optical fiber of the present invention shall be in the range of from 1.29 to 1.35, and the difference $(n_1 - n_2)$ shall be not less than 0.01, and preferably not less than 0.03.

The preferable clad copolymer to be used in the present invention is a copolymer of perfluoro(2,2-dimethyl-1,3-dioxole) and at least one other copolymerizable ethylenically unsaturated monomer. The perfluoro(2,2-dimethyl-1,3-dioxole) can be prepared by, for example, the method disclosed in U.S. Pat. No. 3,865,845, and its copolymer with the unsaturated monomer can be prepared by, for example, the method disclosed in U.S. Pat. No. 3,978,030.

Examples of the copolymerizable ethylenically unsaturated monomer include ethylene, propylene, isobutylene, 1-butene, methylvinylether, ethylvinylether, propylvinylether, butylvinylether, $CF_2=CF_2$, $CHF=CF_2$, $CH_2=CF_2$, $CH_2=CHF$, $CClF=CF_2$, $CHCl=CF_2$, $CCl_2=CF_2$, $CClF=CClF$, $CHF=CCl_2$, $CH_2=CClF$, $CCl_2=CClF$, fluoropropylene compounds such as $CF_3CF=CF_2$ and $CF_3CF=CHF$, monomers having methyl-3-[1-[difluoro[(trifluoroethenyl)oxy]methyl]-1,2,2,2-tetrafluoroethoxy]-2,2,3,3-tetrafluoropropanoate, and 2-{1-[difluoro[(trifluoroethenyl)oxy]methyl]-1,2,2,2-tetrafluoroethoxy}-1,1,2,2-tetrafluoroethanesulfonylfluoride.

The clad polymer shall be amorphous and highly transparent, and shall have a refractive index in the range of from 1.29 to 1.35. To prepare a clad copolymer satisfying these requirements, the content of perfluoro[2,2-dimethyl-1,3-dioxole] unit in the clad polymer is in the range of not less than 20 mole % to 100 mole %, preferably in the range of 25.0 to 99.7 mole %.

Plasticizers are preferably added to the clad copolymer to improve its flowability while maintaining its toughness. A perfluoroalkylether having a Mn of not more than 10,000 is added in an amount of 1 to 50 wt %, preferably 5 to 30 wt % based on 100 wt % of perfluoro[2,2-dimethyl-1,3-dioxole] polymer having a Mn of not less than 15,000. This specific plasticizer is preferably added to the clad polymer, since it has a small tendency to exude. Example of the perfluoroalkylether include

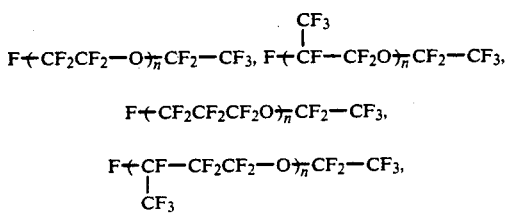

and commercially available ones are that produced by Daikin Kogyo Co., Ltd. under the trademark "Demnum," or that produced by DuPont Co., Ltd. under the trademark "Krytox".

In making the plastic optical fiber of the present invention, the core-clad type conjugate spinning method, the ram extrusion method, the melt coating method of a clad material, and the solvent coating method of clad material can all be used. In manufacturing optical fibers, dust-free conditions are necessary.

Among these methods, the core-clad type conjugate melt spinning method is the most preferable. In conducting this method, the melt flow rate of the core polymer [$MFR_1$] and that of the clad polymer [$MFR_2$] must satisfy the relationship of ($MFR_1 \leq MFR_2$). If an optical fiber is spun from a core polymer and a clad polymer that do not satisfy this relationship, a regular core-clad structure cannot be obtained, and the light transmission properties of the thus-produced fiber are not excellent.

The MFR values of a polymer were measured by a method based on the method A stated in JIS K-7210, formulated in 1976. Namely, 5 g of a polymer is filled in a die having a die length of 8 mm and an inner diameter of 2.0 mm, and the amount of the polymer extruded from the tip of the die for ten minutes as measured, and these values were employed as MFR values.

The plastic optical fiber of the present invention is excellent in light transmission properties, and can transmit light in the visible-to-near infrared region, since the content of the C—H bonds is small and the water absorption is small. The plastic optical fiber of the present invention enables long distance communications exceeding 1 km, and it can be used as an optical fiber in light communication areas such as LAN or FA. In addition to this feature, the optical fiber of the present invention can provide an optical fiber having a large numerical aperture, since this optical fiber is comprised of the core polymer having a refractive index of 1.33 to 1.46, and a clad polymer having a reflective index of 1.29 to 1.35.

The present invention will be described in more detail, with reference to the following examples and comparative examples.

EXAMPLE 1

All monomers to be used were purified by a conventional method, and they were used immediately after distillation.

To 100 parts by weight of a monomer mixture of 70 mole % of trifluoroethylmethacrylate, and 30 mole % of methylmethacrylate, 0.15 wt % of n-octylmercaptan and 30 ppm of ditertiarybutylperoxide were added. The thus-prepared mixture was filtrated with a tetrafluoroethylene membrane filter of 0.02μ pore size, and then polymerized for 15 hours at 150μ under a pressure of $N_2$, and a syrup having a polymerization degree of 47% was obtained. This syrup was fed continuously into a vented extruder to get a polymer containing a residual monomer of not more than 0.5%. This polymer was fed into the core polymer feeding portion in a spinning machine maintained at 210° C. The core polymer had a Tg of 96° C. measured by DSC and a refractive index of 1.424.

The clad copolymer of 50 mole % of perfluoro(2,2-dimethyl-1,3-dioxole) and 50 mole % of tetrafluoroethylene was melted with a melt extruder, and was fed into the clad material feeding portion in the spinning machine.

The fed core and clad polymers were spun through a conjugate spinning nozzle to give an optical fiber having a core-clad structure and an outer diameter of 1 mmφ. The light transmission loss of the thus-produced optical fiber was very small (95 dB/Km at a wavelength of 650 nm; 378 dB/Km at a wavelength of 770 nm; 820 dB/km at a wavelength of 950 nm). The thus-prepared optical fiber was stood for 24 hours under a wet-heat condition of 50° C. and 95% RH, and the light transmission loss of this optical fiber was 396 dB/Km at a wavelength of 770 nm, and the increase in the loss was very small.

EXAMPLE 2

An optical fiber was prepared by using the same method as that described in Example 1 except that a copolymer comprising 43 mole % of trifluoroethylmethacrylate, 12 mole % of 1,1,2,2-tetrahydroperfluorodecylmethacrylate, 43 mole % of methylmethacrylate, and 2 mole % of methacrylic acid, was used as the core polymer. The light transmission loss of the thus-obtained optical fiber was as indicated in Table 1.

EXAMPLES 3 AND 4

In both Examples 3 and 4 an optical fiber was prepared by using the same method as that described in Example 1, except that the core polymer and the clad polymer as indicated in Table 1 were used. The light transmission loss of the thus-obtained optical fiber was as indicated in Table 1.

COMPARATIVE EXAMPLE 1

An optical fiber was prepared by using the same method as described in Example 1, except that PMMA and a copolymer of 50 mole % of perfluoro(2,2-dimethyl-1,3-dioxole), and 50 mole % of tetrafluoroethylene, were used as the core polymer and the clad polymer respectively.

As shown in Table 1, the transmission loss in the near infrared region was large, and the loss greatly increased after the optical fiber was subjected to a wet-heat atmosphere of 50° C. and 95% RH.

The results are shown in Table 1.

COMPARATIVE EXAMPLE 2

An optical fiber was prepared by using the same method as that described in Example 1, except that d,-PMMA and a copolymer of 50mole % of perfluoro(2.2-dimethyl-1,3-dioxole), and 50mole % of tetrafluoroethylene, were used as the core polymer and the clad polymer, respectively.

As shown in Table 1, the initial transmission loss was small, but the transmission loss increased very much after the optical fiber was subjected to the wet-heat atmosphere.

The results are shown in Table 1.

of 650 nm; 108 dB/Km at a wavelength of 770 nm; 201 dB/Km at a wavelength of 950 nm). The thus-prepared optical fiber was stood for 24 hours under a wet-heat condition of 50° C. and 95% RH, and the light transmission loss of this optical fiber was 113 dB/Km at a wavelength of 770 nm, and the increase in the loss was very small.

EXAMPLE 6

An optical fiber was prepared by using the same method as that described in Example 5, except that a copolymer comprising 80 mole % of α-fluorotrifluoroethylacrylate and 20 mole % of α-fluoromethylacrylate

TABLE 1

| | Monomer Concentration in the Core Polymer (Refractive Index) | | Monomer Concentration in the Clad Polymer (Refractive Index) | | Light Transmission Loss (dB/Km) | | | Light Transmission Loss in a wet-heat atmosphere (dB/Km) 770 nm |
|---|---|---|---|---|---|---|---|---|
| | | | | | 650 mn | 770 nm | 950 nm | |
| Ex. 2 | trifluoroethylmethacrylate | 43 mole % | perfluoro(2,2-dimethyl-1,3-dioxole) | 50 mole % | 86 | 303 | 650 | 311 |
| | 1,1,2,2-tetrahydroperfluorodecylmethacrylate | 12 mole % | tetrafluoroethylene | 50 mole % | | | | |
| | methylmethacrylate | 43 mole % | (1.308) | | | | | |
| | methacrylic acid (1.415) | 2 mole % | | | | | | |
| Ex. 3 | 2,2,3,3-tetrafluoropropylmethacrylate | 56 mole % | same as above | | 81 | 265 | 570 | 269 |
| | 1,1,2,2-tetrahydroperfluorooctylmethacrylate | 21 mole % | | | | | | |
| | methylmethacrylate (1.392) | 23 mole % | | | | | | |
| Ex. 4 | trifluoroethylmethacrylate | 70 mole % | perfluoro(2.2-dimethyl-1,3-dioxole) | 50 mole % | 94 | 382 | 817 | 397 |
| | methylmethacrylate (1.424) | 30 mole % | chlorotrifluoroethylene (1.331) | 50 mole % | | | | |
| Comp. Ex. 1 | methylmethacrylate (1.492) | 100 mole % | perfluoro(2.2-dimethyl-1,3-dioxole) | 50 mole % | 117 | 421 | 2360 | 840 |
| | | | tetrafluoroethylene (1.308) | 50 mole % | | | | |
| Comp. Ex. 2 | deutrated methylmethacrylate (1.492) | 100 mole % | same as above | | 65 | 68 | 2300 | 520 |

EXAMPLE 5

All monomers to be used were purified by a conventional method, and they were used immediately after distillation. A monomer mixture was obtained by adding 18 ppm of ditertiarybutylperoxide and 0.3 wt % of n-octylmercaptane to α-fluoro 1,1,1,3,3,3-hexafluoroisopropylacrylate. This mixture was filtrated with a tetrafluoroethylene membrane filter of 0.02μ pore size, and then polymerized for 3 hours at 150° C. under a pressure of N₂, and a syrup having a polymerization degree of 54% was obtained. This syrup was continuously fed into a vented extruder to get a polymer containing a residual monomer of not more than 0.5%. This polymer was fed into the core polymer feeding portion in a spinning machine maintained at 180° C. The core polymer had a Tg of 103° C. measured by DSC and a refractive index of 1.356. A clad copolymer having a refractive index of 1.308 of 50 mole % of perfluoro(2,2-dimethyl-1,3-dioxole) and 50 mole % of tetrafluoroethylene was melted with a melt extruder, and was fed into the clad material feeding portion in the spinning machine.

The fed core and clad polymers were spun through a conjugate spinning nozzle to give an optical fiber having a core-clad structure and an outer diameter of 1 mmφ. The light transmission loss of the thus-produced optical fiber was very small (89 dB/Km at a wavelength was used as the core polymer. The light transmission loss of the optical fiber was as indicated in Table 2.

EXAMPLES 7 AND 8

In both Examples 7 an 8 an optical fiber was prepared by using the same method as that described in Example 6, except that the core polymer and the clad polymer as indicated in Table 2 were used.

The transmission properties was as indicated in Table 2.

EXAMPLE 9

An optical fiber was prepared by spinning at 200° C. a α-fluoro-1,1,1,3,3,3-hexafluoroisopropylacrylate polymer having a refractive index of 1.36 as the core polymer, and a resin composition having a refractive index of 1.303 of 90 wt % of a copolymer comprising 60 mole % of perfluoro(2,2-dimethyl-1,3-dioxole) and 40 mole % of tetrafluoroethylene and 10 wt % of

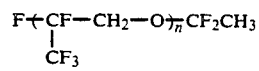

(perfluoroalkylether having a Mn of 8250; this is supplied by DuPont under the trademark "Krytox") with a core-clad conjugate spinning machine. The thus-prepared optical fiber had a core diameter of 980 μm and a clad thickness of 10 μm, and light transmission loss of 70 dB/Km at a wavelength of 650 nm. This optical fiber was wound round a mandrel having a diameter of 10 mm for 100 turns, but it did not exhibit any cracks, and there was not separation in the interface between the core and clad. It was excellent in mechanical strength and handling.

wind-up drum. (42) to (45) are fractionating tubes, and (46) and (47) are bumping prevention valves.

The operation of this apparatus will now be described. The valves (13), (5), (15), (7), (6), (18), (8), (16), (36), and (30) are first closed; the valves (26), (27), (28), (29), (31), and (32) are opened; and the system is depressurized with the vacuum pump (34). Then the cock (32)

TABLE 2

| | Monomer Concentration in the Core Polymer (Refractive Index) | | Monomer Concentration in the Clad Polymer (Refractive Index) | | Light Transmission Loss (dB/Km) | | | Light Transmission Loss in a wet-heat atmosphere (dB/Km) 770 nm |
|---|---|---|---|---|---|---|---|---|
| | | | | | 650 mn | 770 nm | 950 nm | |
| Ex. 5 | α-fluoro 1,1,1,3,3,3-hexafluoroisopropylacrylate (1.356) | 100 mole % | perfluoro(2,2-dimethyl-1,3-dioxole) tetrafluoroethylene (1.308) | 50 mole % 50 mole % | 89 | 108 | 201 | 113 |
| Ex. 6 | α-fluoro 2,2,2-trifluoroethylacrylate | 80 mole % | same as above | | 103 | 140 | 307 | 142 |
| | α-fluoromethylacrylate (1.403) | 20 mole % | | | | | | |
| Ex. 7 | α-fluoro 2,2,2-trifluoroethylacrylate | 70 mole % | same as above | | 105 | 146 | 298 | 146 |
| | α-fluoro 2,2,3,3,3-heptafluoropropylacrylate (1.385) | 30 mole % | | | | | | |
| Ex. 8 | α-fluoro 1,1,1,3,3,3-hexafluoroisopropylacrylate | 70 mole % | same as above | | 94 | 131 | 232 | 135 |
| | α-fluoro 2,2,2-trifluoroethylmethacrylate (1.375) | 30 mole % | | | | | | |

EXAMPLE 10

The attached Figure is a flow diagram of the apparatus used in the Examples. In the Figure, (1) and (2) are still pots for monomers constituting the core polymer; (3) is a still pot for a polymerization initiator; (4) is a still pot for a molecular weight regulator; (5) to (8) are exhaust valves for distillation residues in still pots (1) to (4) respectively: (9) and (10) are reservoirs for the monomers constituting the core polymer; (11) is a reservoir for a polymerization catalyst; (12) is a reservoir for a molecular weight regulator. Each raw material in (9) to (12) is supplied through supply cocks (13) to (16) respectively to the still pots (1) to (4) respectively. (17) to (20) are capillaries for supplying an inert gas, such as N₂, to the still pots (1) to (4) respectively. (21) is a polymerization vessel having a cylinder for heating and cooling. It has an inner diameter of 10 to 100 mm, and it is equipped with a metering meniscus. Each distillate from the still pots (1) to (4) is fed into cooling pipes (22) to (25) respectively, and each cooled distillate is fed through needle cocks (26) to (29) made of fluorine resin for pressurization or depressurization to the polymerization vessel (21). (30), (31), and (32) are also needle cocks made of fluorine resin. They are for pressurization or depressurization. The inert gas passed through cock (30) is then passed through a filter (33) having a pore size of 0.1 μm, and is then fed into the polymerization vessel (21) that is connected to a vacuum pump (34) through needle cocks (31) and (32). The periphery of the polymerization vessel (21) is surrounded by a jacket (35). This jacket is for heating or cooling. The bottom part of the polymerization vessel (21) is connected to a conjugate spinning nozzle (37) through a regulating valve (36) that regulates the rate of supply of the core-forming polymer, and (37A) and 37B) are a core-forming nozzle and a clad-forming nozzle respectively. The optical fiber (39) is wound up through a pulley to a is closed; the cock (30) is opened; and the atmosphere in the apparatus is replaced by dry nitrogen passed through the filter (33). α-fluoro -1,1,1,3,3,3-hexafluoroisopropylacrylate, α-fluoro -2,2,2-trifluoroethylacrylate, 2,2'-azobis (2,4,4-trimethylpentane), and n-methylmercpatane, are supplied into the reservoir (9) for the core-forming main monomer, the reservoir (10) for the core-forming sub-monomer, the reservoir (11) for the polymerization initiator, and the reservoir (12) for the molecular weight regulator, respectively, and each fed material was respectively introduced into the still pots (1) to (4).

The polymerization vessel (21) was completely sealed, and, without containing any O₂ gas in it, was cooled to a temperature of −5° C. The cocks (26), (27), and (29) were closed while the cock (28) was opened, and then 2,2'-azobis(2,4,4-trimethylpentane), held in the reservoir for the polymerization initiator, was fed into the still pot (3) maintained at 100° C. by opening the valve (15). The cock (30) was then closed, the cock (32) was opened, and the distillation system was depressurized to 50 mmHg. N₂ gas was introduced into the still pot (3) through the capillary (19), and the vapors of the polymerization catalyst were sent to the cooling tube (24) to condense them. The thus-obtained solution of the polymerization catalyst was fed into the polymerization vessel (21). The cock (28) was closed, and the cock (29) was opened. n-butylmercaptane was fed into the still pot (4) from the reservoir (12) for the molecular weight regulator by opening the cock (16). The still pot (4) was heated to 80° C. While maintaining the pressure in the system at 200 mmHg, N₂ gas was fed into the still pot (4) through the capillary (29) to feed the vapors of n-butylmercaptane into the cooling tube (25), and the n-methylmercaptane condensed there was fed into the polymerization vessel (21) maintained at −5° C.

The cock (29) was closed, and α-fluoro-2,2,2-trifluoroethylacrylate in the reservoir (10) for the core-forming sub-monomer was fed into the still pot (2) by opening the cocks (27) and (14), while the cocks (26) and (28) were dept closed. While maintaining the pressure in the sealed system at 200 mmHg, the still pot (2) was heated to 80° C. to feed the vapor of α-fluoro-2,2,2-trifluoroethylacrylate to the cooling tube (23) by introducing $N_2$ gas from the capillary (18) into the still pot (2). The condensed solution of the core-forming sub-monomer was fed into the polymerization vessel (21).

The cock (27) was closed, and α-fluoro-1,1,1,3,3,3-hexafluoroisopropylacrylate in the reservoir (9) for the core-forming main monomer was fed into the still pot (1) by opening the cocks (26) and (3) while keeping the cocks (28) and (29) closed. The still pot (1) was heated to 110° C. while maintaining the pressure in the sealed system was kept at 200 mmHg, and $N_2$ gas was introduced through the capillary (17) into the still pot (1) to feed the vapor of the core-forming main monomer to the cooling tube (22). The condensed solution was fed into the polymerization vessel (21).

By means of the steps as given the above, a mixture comprising 80 mole % of α-fluoro-1,1,1,3,3,3-hexafluoroisopropylacrylate, 19.5 mole % of α-fluoro-2,2,2-trifluoroethylacrylate, 0.1 mole % of azobis (2,4,4-trimethylpentane), and 0.4 mole % of n-butylmercaptane was fed into the polymerization vessel (21). After closing the cocks (26) and (32), the cock (30) was opened, and $N_2$ gas was fed into the polymerization vessel (21) by opening the cock (39) to increase the pressure in the polymerization vessel (21) to 3 kg/cm², and then the system was sealed again.

The polymerization vessel (21) was heated for 7 days at 105° C., then for 20 hours at 135° C., and finally for 20 hours at 180° C., to polymerize the mixture in the vessel (21), and this bulk polymerization was completed. The thus-polymerized core-forming polymer has a refractive index of 1.360.

The cocks (31) and (36) were opened to extrude the melted core-forming polymer through the nozzle (37A). A clad-forming copolymer comprising 50 mole % of perfluoro(2,2-dimethyl-1,3-dioxole) and 50 mole % of tetrafluoroethylene and having a refractive index of 1.306, was also extruded through the pipe (38) through the nozzle (37B). By conducting the conjugate melt spinning of the core and clad polymers while maintaining the nozzle (37) at 170° C., an optical fiber having a core diameter of 980 μm and a clad thickness of 10 μm was obtained. The light transmission loss of this optical fiber was 48 dB/Km at a wavelength of 650 nm, 87 dB/Km at 770 nm, 162 dB/Km at 950 nm, and its numerical aperture was 0.38.

EXAMPLE 11

The same monomer mixture for the core-forming polymer used in Example 9 was filled into a sealed polymerization vessel having an inner diameter of 20 mm, and an effective length of 1,000 mm. The monomer mixture was polymerized by the same method as described in Example 9, and a core polymer having a rod-like shape and a refractive index of 1.360 was obtained. A clad copolymer comprising 50 mole % of perfluoro(2,2-dimethyl -1,3-dioxole) and 50 mole % of tetrafluoroethylene having a refractive index of 1.308 was melt-shaped to get a pipe having an inner diameter of 20 mm and outer diameter of 22 mm. The core polymer of a rod shape was inserted into this pipe to prepare a rod for forming an optical fiber. These steps were all taken in the clean room whose atmosphere has a cleanliness of 100 measured by the method stated in Fed. Std. No. 209B.

The thus-prepared rod for forming an optical fiber was inserted in a ram extruder, and while the bottom portion (the range which in 10 mm from the bottom) of the rod was maintained at 180° C., the rod was extruded by a pressure of 3 kg/cm² through a spinning nozzle to get an optical fiber having an outer diameter of 1,000 μm. The light transmission loss of this optical fiber was 59 dB/Km at a wavelength of 650 nm, 96 dB/Km at 770 nm, 192 dB/Km at 950 nm.

Having now fully described the present invention, it will be apparent to one skilled in the art that many changes and modifications can be made thereto without departing from the spirit or scope of the present invention as stated above.

What is claimed is:

1. A plastic optical fiber comprising (a) a core polymer having a refractive index of $N_1$ and obtained by polymerizing a monomer represented by the general formula as the main monomer, and (b) a clad polymer comprising a polymer having a refractive index of $n_2$ and obtained by polymerizing perfluoro (2,2-dimethyl-1,3-dioxole) as the main monomer, and which satisfies the relation $(n_1 - n_2 \geq 0.01)$:

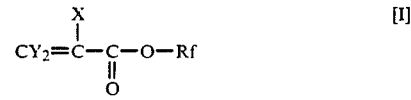

wherein X represents $CH_3$, H, D, F, Cl, or $CF_3$, Y represents H or D, and Rf represents a fluoroalkyl group having a linear or branched chain.

2. The plastic optical fiber as claimed in claim 1, wherein said clad polymer is formed of a mixture comprising 50 to 99% by weight of a copolymer of perfluoro(2,2-dimethyl-1,3-dioxole) and 1 to 50% by weight of a perfluoroalkylether.

3. The plastic optical fiber as claimed in claim 1, wherein said core polymer is a bulk polymer obtained by conducting a polymerization in a completely sealed system having a cleanliness of not less than 100.

4. The plastic optical fiber as claimed in claim 1, wherein said core polymer is a polymer having a refractive index $n_1$ of 1.33 to 1.46; and said clad polymer is a polymer having a refractive index $n_2$ of 1.29 to 1.35; and which satisfies the relationship of $(n_1 - n_2 \geq 0.03)$.

5. The plastic optical fiber as claimed in claim 1, wherein said monomer represented by the general formula is an α-fluoro-fluoroalkylacrylate.

6. A process for the production of a plastic optical fiber comprising (a) using, as a core polymer, a polymer having a refractive index $n_1$ and composed of the main monomer represented by the general formula, (b) using, as a clad polymer, a polymer having a refractive index $n_2$ and composed of the main monomer of perfluoro(2,2-dimethyl-1,3-dioxole), (c) selecting the difference $(n_1 - n_2)$ to be 0.01 or more, and (d) forming the fiber by a melt-extrusion method:

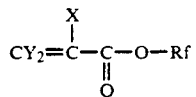

[I]

wherein X represents $CH_3$, H, D, F, Cl, or $CF_3$, Y represents H or D, and Rf represents a fluoroalkyl group having a linear or branched chain.

7. The process as claimed in claim 6, wherein said clad polymer is a mixture comprising 50 to 99% by weight of a polymer comprising perfluoro(2,2-dimethyl-1,3-dioxole) and 1 to 50% by weight of a perfluoroalkylether.

8. The process as claimed in claim 6, wherein a ram-extrusion method is employed as said melt-extrusion method.

9. The process as claimed in claim 6, wherein said monomer represented by the general formula is an α-fluoro-fluoroalkylacrylate.

* * * * *

UNITED STATES PATENT AND TRADEMARK OFFICE
CERTIFICATE OF CORRECTION

PATENT NO. : 5,111,526

DATED : May 5, 1992

INVENTOR(S) : Yamamoto et al.

It is certified that error appears in the above-identified patent and that said Letters Patent is hereby corrected as shown below:

Claim 1, column 12, line 21, "$N_1$" should read --$n_1$--;

line 23, "formula" should read

--formula [I]--.

Claim 5, column 12, line 59, before "is" insert

--[I]--.

Claim 6, column 12, line 63, "formula" should read

--formula [I]--.

Claim 9, column 14, line 9, "formula" should read

--formula [I]--.

Signed and Sealed this

Seventh Day of September, 1993

Attest:

BRUCE LEHMAN

*Attesting Officer*     *Commissioner of Patents and Trademarks*